US010303246B2

(12) United States Patent
Vidal et al.

(10) Patent No.: US 10,303,246 B2
(45) Date of Patent: May 28, 2019

(54) SYSTEMS, DEVICES, AND METHODS FOR PROXIMITY-BASED EYE TRACKING

(71) Applicant: THALMIC LABS INC., Kitchener (CA)

(72) Inventors: Mélodie Vidal, Kitchener (CA); Jake Chapeskie, Kitchener (CA)

(73) Assignee: North Inc., Kitchener, ON (CA)

(*) Notice: Subject to any disclaimer, the term of this patent is extended or adjusted under 35 U.S.C. 154(b) by 95 days.

(21) Appl. No.: 15/411,627

(22) Filed: Jan. 20, 2017

(65) Prior Publication Data

US 2017/0205876 A1 Jul. 20, 2017

Related U.S. Application Data

(60) Provisional application No. 62/281,041, filed on Jan. 20, 2016.

(51) Int. Cl.
*G02B 27/01* (2006.01)
*G06F 3/01* (2006.01)
(Continued)

(52) U.S. Cl.
CPC .............. *G06F 3/013* (2013.01); *G01S 17/08* (2013.01); *G01S 17/42* (2013.01); *G01S 17/46* (2013.01);
(Continued)

(58) Field of Classification Search
CPC .......... G06F 3/013; G06F 3/011; G01S 17/87; G01S 17/88; G01S 17/46; G01S 17/08;
(Continued)

(56) References Cited

U.S. PATENT DOCUMENTS 3,408,133 A 10/1968 Lee
3,712,716 A 1/1973 Cornsweet et al.
(Continued)

FOREIGN PATENT DOCUMENTS

JP 61-198892 A 9/1986
JP 10-319240 A 12/1998
(Continued)

OTHER PUBLICATIONS

International Search Report and Written Opinion, dated Dec. 8, 2016, for International Application No. PCT/US2016/050225, 15 pages.

(Continued)

*Primary Examiner* — Mihir K Rayan
(74) *Attorney, Agent, or Firm* — Thomas Mahon

(57) ABSTRACT

Systems, devices, and methods for proximity-based eye tracking are described. A proximity sensor positioned near the eye monitors the distance to the eye, which varies depending on the position of the corneal bulge. The corneal bulge protrudes outward from the surface of the eye and so, all other things being equal, a static proximity sensor detects a shorter distance to the eye when the cornea is directed towards the proximity sensor and a longer distance to the eye when the cornea is directed away from the proximity sensor. Optical proximity sensors that operate with infrared light are used as a non-limiting example of proximity sensors. Multiple proximity sensors may be used and processed simultaneously in order to provide a more accurate/precise determination of the gaze direction of the user. Implementations in which proximity-based eye trackers are incorporated into wearable heads-up displays are described.

13 Claims, 3 Drawing Sheets

(51) Int. Cl.

| | |
|---|---|
| ***G01S 17/08*** | (2006.01) |
| ***G01S 17/10*** | (2006.01) |
| ***G01S 17/32*** | (2006.01) |
| ***G01S 17/46*** | (2006.01) |
| ***G01S 17/42*** | (2006.01) |
| ***G01S 17/58*** | (2006.01) |
| ***G01S 17/66*** | (2006.01) |
| ***G01S 17/87*** | (2006.01) |
| ***G01S 17/88*** | (2006.01) |
| ***G02B 27/00*** | (2006.01) |
| ***G06F 1/16*** | (2006.01) |

(52) U.S. Cl.
CPC .............. *G01S 17/58* (2013.01); *G01S 17/66* (2013.01); *G01S 17/87* (2013.01); *G01S 17/88* (2013.01); *G02B 27/0093* (2013.01); *G02B 27/0172* (2013.01); *G02B 27/0176* (2013.01); *G06F 1/163* (2013.01); *G06F 3/011* (2013.01); *G01S 17/10* (2013.01); *G01S 17/32* (2013.01); *G02B 2027/014* (2013.01); *G02B 2027/0178* (2013.01)

(58) Field of Classification Search
CPC .......... G01S 17/66; G01S 17/42; G01S 17/58; G01S 17/10; G02B 27/0093; G02B 27/0172; G02B 27/0176; G02B 2027/0178; G02B 2027/014
See application file for complete search history.

(56) References Cited

U.S. PATENT DOCUMENTS

| | | | | |
|---|---|---|---|---|
| 4,649,504 | A * | 3/1987 | Krouglicof | G01S 5/163 340/980 |
| 4,978,213 | A | 12/1990 | El Hage | |
| 5,103,323 | A | 4/1992 | Magarinos et al. | |
| 5,231,674 | A | 7/1993 | Cleveland et al. | |
| 5,467,104 | A | 11/1995 | Furness, III et al. | |
| 5,589,956 | A | 12/1996 | Morishima et al. | |
| 5,596,339 | A | 1/1997 | Furness, III et al. | |
| 5,742,421 | A | 4/1998 | Wells et al. | |
| 6,008,781 | A | 12/1999 | Furness, III et al. | |
| 6,027,216 | A | 2/2000 | Guyton et al. | |
| 6,110,110 | A * | 8/2000 | Dublin, Jr. | A61B 5/021 600/398 |
| 6,184,847 | B1 | 2/2001 | Fateh et al. | |
| 6,204,829 | B1 | 3/2001 | Tidwell | |
| 6,236,476 | B1 | 5/2001 | Son et al. | |
| 6,317,103 | B1 | 11/2001 | Furness, III et al. | |
| 6,353,503 | B1 | 3/2002 | Spitzer et al. | |
| 6,377,277 | B1 | 4/2002 | Yamamoto | |
| 6,639,570 | B2 | 10/2003 | Furness, III et al. | |
| 6,972,734 | B1 | 12/2005 | Ohshima et al. | |
| 7,473,888 | B2 | 1/2009 | Wine et al. | |
| 7,640,007 | B2 | 12/2009 | Chen et al. | |
| 7,684,105 | B2 | 3/2010 | Lamontagne et al. | |
| 7,747,113 | B2 | 6/2010 | Mukawa et al. | |
| 7,773,111 | B2 | 8/2010 | Cleveland et al. | |
| 7,850,306 | B2 | 12/2010 | Uusitalo et al. | |
| 7,925,100 | B2 | 4/2011 | Howell et al. | |
| 7,927,522 | B2 | 4/2011 | Hsu | |
| 8,120,828 | B2 | 2/2012 | Schwerdtner | |
| 8,179,604 | B1 | 5/2012 | Prada Gomez et al. | |
| 8,188,937 | B1 | 5/2012 | Amafuji et al. | |
| 8,355,671 | B2 | 1/2013 | Kramer et al. | |
| 8,560,976 | B1 | 10/2013 | Kim | |
| 8,634,119 | B2 | 1/2014 | Bablumyan et al. | |
| 8,657,442 | B2 * | 2/2014 | Bonnin | G06K 9/00604 351/209 |
| 8,666,212 | B1 | 3/2014 | Amirparviz | |
| 8,704,882 | B2 | 4/2014 | Turner | |
| 8,922,481 | B1 | 12/2014 | Kauffmann et al. | |
| 8,922,898 | B2 | 12/2014 | Legerton et al. | |
| 8,970,571 | B1 | 3/2015 | Wong et al. | |
| 8,971,023 | B2 | 3/2015 | Olsson et al. | |
| 9,086,687 | B2 | 7/2015 | Park et al. | |
| 9,135,708 | B2 | 9/2015 | Ebisawa | |
| 2001/0033402 | A1 | 10/2001 | Popovich | |
| 2002/0003627 | A1 | 1/2002 | Rieder | |
| 2002/0007118 | A1 | 1/2002 | Adachi et al. | |
| 2002/0030636 | A1 | 3/2002 | Richards | |
| 2002/0093701 | A1 | 7/2002 | Zhang et al. | |
| 2002/0120916 | A1 | 8/2002 | Snider, Jr. | |
| 2004/0174287 | A1 | 9/2004 | Deak | |
| 2005/0012715 | A1 | 1/2005 | Ford | |
| 2006/0238707 | A1 | 10/2006 | Elvesjo et al. | |
| 2007/0014552 | A1 * | 1/2007 | Ebisawa | A61B 3/113 396/51 |
| 2007/0078308 | A1 | 4/2007 | Daly | |
| 2007/0132785 | A1 | 6/2007 | Ebersole, Jr. et al. | |
| 2008/0137909 | A1 * | 6/2008 | Lee | A61B 3/113 382/103 |
| 2009/0109241 | A1 | 4/2009 | Tsujimoto | |
| 2009/0179824 | A1 | 7/2009 | Tsujimoto et al. | |
| 2009/0207464 | A1 | 8/2009 | Wiltshire et al. | |
| 2009/0258669 | A1 | 10/2009 | Nie et al. | |
| 2009/0322653 | A1 | 12/2009 | Putilin et al. | |
| 2010/0053555 | A1 | 3/2010 | Enriquez et al. | |
| 2010/0060551 | A1 | 3/2010 | Sugiyama et al. | |
| 2010/0142015 | A1 | 6/2010 | Kuwahara et al. | |
| 2010/0149073 | A1 * | 6/2010 | Chaum | G02B 27/0093 345/8 |
| 2010/0150415 | A1 | 6/2010 | Atkinson et al. | |
| 2010/0239776 | A1 | 9/2010 | Yajima et al. | |
| 2010/0320480 | A1 * | 12/2010 | Rapoport | H01L 33/50 257/88 |
| 2012/0002256 | A1 | 1/2012 | Lacoste et al. | |
| 2012/0050681 | A1 * | 3/2012 | Bonnin | A61B 3/113 351/210 |
| 2012/0050682 | A1 * | 3/2012 | Bonnin | A61B 3/113 351/210 |
| 2012/0139817 | A1 | 6/2012 | Freeman | |
| 2012/0169752 | A1 | 7/2012 | Kurozuka | |
| 2012/0182309 | A1 | 7/2012 | Griffin et al. | |
| 2012/0188158 | A1 | 7/2012 | Tan et al. | |
| 2012/0249797 | A1 | 10/2012 | Haddick et al. | |
| 2012/0290401 | A1 | 11/2012 | Neven | |
| 2012/0302289 | A1 | 11/2012 | Kang | |
| 2013/0009853 | A1 | 1/2013 | Hesselink et al. | |
| 2013/0016292 | A1 | 1/2013 | Miao et al. | |
| 2013/0016413 | A1 | 1/2013 | Saeedi et al. | |
| 2013/0088413 | A1 | 4/2013 | Raffle et al. | |
| 2013/0135722 | A1 | 5/2013 | Yokoyama | |
| 2013/0165813 | A1 | 6/2013 | Chang et al. | |
| 2013/0169560 | A1 | 7/2013 | Cederlund et al. | |
| 2013/0198694 | A1 | 8/2013 | Rahman et al. | |
| 2013/0215235 | A1 | 8/2013 | Russell | |
| 2013/0222384 | A1 | 8/2013 | Futterer | |
| 2013/0265437 | A1 | 10/2013 | Thörn et al. | |
| 2013/0285901 | A1 | 10/2013 | Lee et al. | |
| 2013/0300652 | A1 | 11/2013 | Raffle et al. | |
| 2013/0332196 | A1 | 12/2013 | Pinsker | |
| 2013/0335302 | A1 | 12/2013 | Crane et al. | |
| 2014/0045547 | A1 | 2/2014 | Singamsetty et al. | |
| 2014/0085189 | A1 * | 3/2014 | Shimasaki | G06F 3/013 345/156 |
| 2014/0125760 | A1 | 5/2014 | Au et al. | |
| 2014/0198034 | A1 | 7/2014 | Bailey et al. | |
| 2014/0198035 | A1 | 7/2014 | Bailey et al. | |
| 2014/0202643 | A1 | 7/2014 | Hikmet et al. | |
| 2014/0204455 | A1 | 7/2014 | Popovich et al. | |
| 2014/0204465 | A1 | 7/2014 | Yamaguchi | |
| 2014/0226193 | A1 | 8/2014 | Sun | |
| 2014/0232651 | A1 | 8/2014 | Kress et al. | |
| 2014/0285429 | A1 | 9/2014 | Simmons | |
| 2014/0368896 | A1 | 12/2014 | Nakazono et al. | |
| 2014/0375541 | A1 * | 12/2014 | Nister | G06F 3/013 345/156 |
| 2015/0035744 | A1 * | 2/2015 | Robbins | G02B 27/017 345/156 |
| 2015/0036221 | A1 | 2/2015 | Stephenson | |

(56) References Cited

U.S. PATENT DOCUMENTS

| | | | | |
|---|---|---|---|---|
| 2015/0085250 | A1* | 3/2015 | Larsen | G06K 9/00604 351/206 |
| 2015/0156716 | A1 | 6/2015 | Raffle et al. | |
| 2015/0205126 | A1 | 7/2015 | Schowengerdt | |
| 2015/0205134 | A1 | 7/2015 | Bailey et al. | |
| 2015/0268821 | A1 | 9/2015 | Ramsby et al. | |
| 2015/0325202 | A1 | 11/2015 | Lake et al. | |
| 2015/0362734 | A1 | 12/2015 | Moser et al. | |
| 2015/0378161 | A1 | 12/2015 | Bailey et al. | |
| 2015/0378162 | A1 | 12/2015 | Bailey et al. | |
| 2015/0378164 | A1 | 12/2015 | Bailey et al. | |
| 2016/0033771 | A1 | 2/2016 | Tremblay et al. | |
| 2016/0084949 | A1* | 3/2016 | Huang | G01C 3/32 348/78 |
| 2016/0202081 | A1 | 7/2016 | Debieuvre et al. | |
| 2016/0238845 | A1 | 8/2016 | Alexander et al. | |
| 2016/0274365 | A1 | 9/2016 | Bailey et al. | |
| 2016/0274758 | A1 | 9/2016 | Bailey | |
| 2016/0313899 | A1 | 10/2016 | Noel | |
| 2016/0327796 | A1 | 11/2016 | Bailey et al. | |
| 2016/0327797 | A1 | 11/2016 | Bailey et al. | |
| 2016/0349514 | A1 | 12/2016 | Alexander et al. | |
| 2016/0349515 | A1 | 12/2016 | Alexander et al. | |
| 2016/0349516 | A1 | 12/2016 | Alexander et al. | |
| 2016/0377865 | A1 | 12/2016 | Alexander et al. | |
| 2016/0377866 | A1 | 12/2016 | Alexander et al. | |
| 2017/0068095 | A1 | 3/2017 | Holland et al. | |
| 2017/0097753 | A1 | 4/2017 | Bailey et al. | |
| 2017/0115483 | A1* | 4/2017 | Aleem | G02B 27/0093 |
| 2017/0153701 | A1 | 6/2017 | Mahon et al. | |
| 2017/0212290 | A1 | 7/2017 | Alexander et al. | |
| 2017/0212349 | A1 | 7/2017 | Bailey et al. | |
| 2017/0219829 | A1 | 8/2017 | Bailey | |
| 2017/0299956 | A1 | 10/2017 | Holland et al. | |
| 2017/0343796 | A1 | 11/2017 | Bailey et al. | |
| 2017/0343797 | A1 | 11/2017 | Bailey et al. | |
| 2018/0007255 | A1 | 1/2018 | Tang | |

FOREIGN PATENT DOCUMENTS

| | | | |
|---|---|---|---|
| JP | 2013-127489 | A | 6/2013 |
| JP | 2013-160905 | A | 8/2013 |
| KR | 10-2004-0006609 | A | 1/2004 |
| WO | 2014/155288 | A2 | 10/2014 |
| WO | 2015/123775 | A1 | 8/2015 |

OTHER PUBLICATIONS

International Search Report and Written Opinion, dated Jan. 18, 2017, for International Application No. PCT/US2016/054852, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Merriam-Webster, "Radio Frequencies" retrieved from https://www.merriam-webster.com/table/collegiate/radiofre.htm, retrieved on Jul. 12, 2017, 2 pages.

Amitai, "P-27: A Two-Dimensional Aperture Expander for Ultra-Compact, High-Performance Head-Worn Displays," *SID Symposium Digest of Technical Papers 36* (1):360-363, 2005.

Äyräs et al., "Exit pupil expander with a large field of view based on diffractive optics," *Journal of the SID 17*(8):659-664, 2009.

Chellappan et al., "Laser-based displays: a review," *Applied Optics 49*(25):F79-F98, 2010.

Cui et al., "Diffraction from angular multiplexing slanted volume hologram gratings," *Optik 116*:118-122, 2005.

Curatu et al., "Dual Purpose Lens for an Eye-Tracked Projection Head-Mounted Display," International Optical Design Conference 2006, *SPIE-OSA 6342*:63420X-1-63420X-7, 2007.

Curatu et al., "Projection-based head-mounted display with eye-tracking capabilities," *Proc. of SPIE 5875*:58750J-1-58750J-9, 2005.

Essex, "Tutorial on Optomechanical Beam Steering Mechanisms," OPTI 521 Tutorial, College of Optical Sciences, University of Arizona, 8 pages, 2006.

Fernández et al., "Optimization of a thick polyvinyl alcohol-acrylamide photopolymer for data storage using a combination of angular and peristrophic holographic multiplexing," *Applied Optics 45*(29):7661-7666, 2009.

Hainich et al., "Chapter 10: Near-Eye Displays," *Displays: Fundamentals & Applications*, AK Peters/CRC Press, 2011, 65 pages.

Hornstein et al., "Maradin's Micro-Mirror—System Level Synchronization Notes," SID 2012 Digest, pp. 981-984.

International Search Report, dated Jun. 8, 2016, for PCT/US2016/018293, 17 pages.

International Search Report, dated Jun. 8, 2016, for PCT/US2016/018298, 14 pages.

International Search Report, dated Jun. 8, 2016, for PCT/US2016/018299, 12 pages.

Itoh et al., "Interaction-Free Calibration for Optical See-Through Head-Mounted Displays based on 3D Eye Localization," 2014 IEEE Symposium on 3D User Interfaces (3DUI), pp. 75-82, 2014.

Kessler, "Optics of Near to Eye Displays (NEDs)," Presentation—Oasis 2013, Tel Aviv, Feb. 19, 2013, 37 pages.

Kress et al., "A review of head-mounted displays (HMD) technologies and applications for consumer electronics," *Proc. of SPIE 8720*:87200A-1-87200A-13, 2013.

Kress et al., "Diffractive and Holographic Optics as Optical Combiners in Head Mounted Displays," Proceedings of the 2013 ACM Conference on Pervasive and Ubiquitous Computing Adjunct Publication, pp. 1479-1482, 2013.

Kress, "Optical architectures for see-through wearable displays," Presentation—Bay Area—SID Seminar, Apr. 30, 2014, 156 pages.

Levola, "7.1: Invited Paper: Novel Diffractive Optical Components for Near to Eye Displays," *SID Symposium Digest of Technical Papers 37*(1):64-67, 2006.

Liao et al., "The Evolution of MEMS Displays," *IEEE Transactions on Industrial Electronics 56*(4): 1057-1065, 2009.

Lippert, "Chapter 6: Display Devices: RSD™ (Retinal Scanning Display)," *The Avionics Handbook*, CRC Press, 2001, 8 pages.

Majaranta et al., "Chapter 3—Eye-Tracking and Eye-Based Human-Computer Interaction," in *Advances in Physiological Computing*, Springer-Verlag London, 2014, pp. 17-39.

Schowengerdt et al., "Stereoscopic retinal scanning laser display with integrated focus cues for ocular accommodation" *Proc. of SPIE-IS&T Electronic Imaging 5921*:366-376, 2004.

Silverman et al., "58.5L: *Late-News Paper*: Engineering a Retinal Scanning Laser Display with Integrated Accommodative Depth Cues," SID 03 Digest, pp. 1538-1541, 2003.

Takatsuka et al., "Retinal projection display using diffractive optical element," Tenth International Conference on Intelligent Information Hiding and Multimedia Signal Processing, IEEE, 2014, pp. 403-406.

Urey et al., " Optical performance requirements for MEMS-scanner based microdisplays," Conf. on MOEMS and Miniaturized Systems, *SPIE 4178*:176-185, 2000.

Urey, "Diffractive exit-pupil expander for display applications," *Applied Optics 40*(32):5840-5851, 2001.

Viirre et al., "The Virtual Retinal Display: A New Technology for Virtual Reality and Augmented Vision in Medicine," *Proc. of Medicine Meets Virtual Reality*, IOS Press and Ohmsha, 1998, pp. 252-257. (6 pages).

International Search Report and Written Opinion dated Apr. 25, 2017 for corresponding International Application No. PCT/US2016/067246, 12 pages.

* cited by examiner

SYSTEMS, DEVICES, AND METHODS FOR PROXIMITY-BASED EYE TRACKING

TECHNICAL FIELD

The present systems, devices, and methods generally relate to eye tracking technologies and particularly relate to proximity-based eye tracking technologies that determine a user's gaze direction by monitoring the distance to the user's eye from one or more fixed location(s).

BACKGROUND

Description of the Related Art

Wearable Heads-Up Displays

A wearable heads-up display ("WHUD") is a head-mounted display that enables the user to see displayed content but does not prevent the user from being able to see their external environment. When on the user's head, a WHUD secures at least one electronic display within an accessible field of view of at least one of the user's eyes, regardless of the position or orientation of the user's head. This at least one display is either transparent or at a periphery of the user's field of view so that the user is still able to see their external environment. Examples of WHUDs include: the Google Glass®, the Optinvent Ora®, the Epson Moverio®, the Sony Glasstron®, just to name a few.

Two challenges in the design of most WHUD devices are: i) maximizing functionality while at the same time minimizing the bulk of the WHUD unit itself, and ii) providing an appropriate interface for controlling and/or interacting with content displayed on the WHUD. These two challenges are related in that an appropriate interface for interacting with a WHUD should, ideally, not contribute significant bulk to be carried by the user (either on the WHUD itself or elsewhere on the user's body). For example, a particular appeal of WHUDs is that they free up the user's hands, enabling the user to see displayed content on a portable display screen without having to physically clutch or grasp the screen in their hand(s). Given this, it is generally not appropriate for an interface for interacting with a WHUD to encumber the user's hand(s) as such would negate the benefit of the hands-free nature of the WHUD.

All of the wearable heads-up display devices available today are noticeably bulkier than a typical pair of eyeglasses or sunglasses. Many design and/or technological factors contribute to this bulk, including without limitation: the display technology being implemented, the size and packaging of on-board components, the power requirements, and certain interface schemes (e.g., buttons or touch screens located on the WHUD itself). Components and functionalities with high power requirements can necessitate large on-board batteries or other power supplies which can contribute significant bulk to the overall system. There remains a need in the art for WHUD technologies, and particularly WHUD interface technologies, that enable WHUD devices of more aesthetically-appealing design.

Eye Tracking

Eye tracking is a process by which the position, orientation, and/or motion of the eye is measured and/or monitored. Typically, the position, orientation, and/or motion of a specific feature of the eye, such as the cornea, pupil, iris, or retinal blood vessels, is measured and/or monitored. Eye tracking information may be used to determine the gaze direction of the eye and deduce what the user is looking at, which in turn may be used to interact with content displayed by a WHUD. Thus, eye tracking has the potential to provide an interface for interacting with a WHUD. A limitation of most eye tracking technologies developed to date is that they compromise the aesthetic design of a WHUD when incorporated therein, either directly due to bulk of the physical eye tracking components and/or indirectly due to large power requirements of the eye tracking components or processes, which necessitate a large battery to be incorporated into the WHUD.

The eye may be tracked in a variety of different ways, the least invasive of which typically employs a camera to capture images and/or videos of the eye. Such camera-based methods typically involve illuminating the complete eye area all at once with infrared light and analyzing images/videos of the illuminated eye to identify characteristic reflections of the infrared light from a particular eye feature. Corneal reflection, also known as the first Purkinje image or "glint," is a characteristic reflection that is used by many camera-based eye trackers. To summarize, conventional eye tracking methods illuminate the eye to produce a characteristic reflection, such as the glint, and analyze images/videos of the eye to identify the relative position and/or motion of the glint.

Camera-based eye trackers consume a relatively large amount of power. Eye movements can be very fast (on the order of milliseconds) so in order to keep track of the eye both the infrared illumination and the camera are required to be active very often (e.g., at all times, high sampling frequency). In many cases, the camera may provide a constant (or near-constant) video stream that is highly consumptive of power. Additionally, the computational processing required to identify glints in such video/photo streams is quite high and therefore also consumptive of significant power. This high power consumption means that camera-based eye trackers generally require a large power supply, so their incorporation into WHUDs typically contributes significant bulk to the overall aesthetic.

There is a need in the art for systems, devices, and methods of eye tracking that can integrate into a WHUD with minimal effect on the size and form factor of the system.

BRIEF SUMMARY

A proximity-based eye tracker may be summarized as including a first illumination source to illuminate at least a portion of an eye of a user with infrared light; a first photodetector to detect reflections of infrared light from the eye of the user; a processor communicatively coupled to at least the first photodetector; and a non-transitory processor-readable storage medium communicatively coupled to the processor, wherein the non-transitory processor-readable storage medium stores data and/or instructions that, when executed by the processor, cause the processor to: determine a distance between the first photodetector and the eye of the user based on reflections of infrared light from the eye of the user; and determine a gaze direction of the user based on at least the distance between the first photodetector and the eye of the user.

The proximity-based eye tracker may further include: a second illumination source to illuminate at least a portion of the eye of the user with infrared light; and a second photodetector to detect reflections of infrared light from the eye of the user, wherein: the processor is communicatively coupled to the second photodetector; and the non-transitory processor-readable storage medium stores data and/or instructions that, when executed by the processor, cause the processor to: determine a distance between the second photodetector and the eye of the user based on reflections of infrared light from the eye of the user, and wherein the data and/or instructions that, when executed by the processor, cause the processor to determine a gaze direction of the user based on at least the distance between the first photodetector and the eye of the user cause the processor to determine the gaze direction of the user based on both the distance between the first photodetector and the eye of the user and the distance between the second photodetector and the eye of the user. The first illumination source may be to illuminate at least a portion of the eye of the user with infrared light having a first wavelength and the second illumination source may be to illuminate at least a portion of the eye of the user with infrared light having the first wavelength. Alternatively, the first illumination source may be to illuminate at least a portion of the eye of the user with infrared light having a first wavelength and the second illumination source may be to illuminate at least a portion of the eye of the user with infrared light having a second wavelength that is different from the first wavelength. The proximity-based eye tracker may further include: at least one additional illumination source to illuminate at least a portion of the eye of the user with infrared light; and at least one additional photodetector to detect reflections of infrared light from the eye of the user, wherein: the processor is communicatively coupled to the at least one additional photodetector; and the non-transitory processor-readable storage medium stores data and/or instructions that, when executed by the processor, cause the processor to: determine a distance between the at least one additional photodetector and the eye of the user based on reflections of infrared light from the eye of the user, and wherein the data and/or instructions that, when executed by the processor, cause the processor to determine the gaze direction of the user based on both the distance between the first photodetector and the eye of the user and the distance between the second photodetector and the eye of the user cause the processor to determine the gaze direction of the user based on: the distance between the first photodetector and the eye of the user, the distance between the second photodetector and the eye of the user, and the distance between the at least one additional photodetector and the eye of the user.

The proximity-based eye tracker may include: a support frame that in use is worn on a head of the user, wherein the first illumination source and the first photodetector are both mounted on the support frame, the first illumination source positioned to illuminate at least a portion of the eye of the user with infrared light when the support frame is worn on the head of the user and the first photodetector positioned to detect reflections of infrared light from the eye of the user when the support frame is worn on the head of the user. The first illumination source and the first photodetector may be positioned within about 1 cm of each other on the support frame.

The data and/or instructions that, when executed by the processor, cause the processor to determine a distance between the first photodetector and the eye of the user based on reflections of infrared light from the eye of the user may cause the processor to determine a distance between the first photodetector and the eye of the user based on at least one property selected from a group consisting of: intensity of reflections of infrared light from the eye of the user, power of reflections of infrared light from the eye of the user, luminance of reflections of infrared light from the eye of the user, and/or time of flight of reflections of infrared light from the eye of the user. The first illumination source may be selected from a group consisting of: an infrared light-emitting diode ("LED"), an infrared laser diode, and a scanning laser projector. Infrared light may be of a wavelength in the range of about 700 nm to about 10 um.

The proximity-based eye tracker may include: a second photodetector to detect reflections of infrared light from the eye of the user, wherein: the processor is communicatively coupled to the second photodetector; and the non-transitory processor-readable storage medium further stores data and/or instructions that, when executed by the processor, cause the processor to: determine a distance between the second photodetector and the eye of the user based on reflections of infrared light from the eye of the user; and determine the gaze direction of the user based on both the distance between the first photodetector and the eye of the user and the distance between the second photodetector and the eye of the user.

The proximity-based eye tracker may include: a first optical configuration positioned proximate an output of the first illumination source in an optical path of infrared light emitted by the first illumination source, the first optical configuration to shape infrared light emitted by first illumination source to a cone that illuminates the at least a portion of the eye of the user; and a second optical configuration positioned proximate an input of the first photodetector in an optical path of infrared light reflected from the eye of the user, the second optical configuration to focus infrared light reflected by the at least a portion of the eye of the user on the first photodetector.

The proximity-based eye tracker may include: a first filter configuration positioned proximate the input of the first photodetector to transmit infrared light having a first wavelength through to the photodetector and block light having a wavelength other than the first wavelength from reaching the photodetector.

The data and/or instructions that, when executed by the processor, cause the processor to determine a gaze direction of the user based on at least the distance between the first photodetector and the eye of the user may cause the processor to determine that the user is gazing in a direction towards the first photodetector when the distance between the first photodetector and the eye of the user is determined to be at or near a minimum value and that the user is gazing in a direction other than towards the first photodetector when the distance between the first photodetector and the eye of the user is determined to be at or near a maximum value.

A method of determining a gaze direction of a user may be summarized as including: illuminating at least a portion of an eye of the user with infrared light by a first illumination source; detecting reflections of infrared light from the eye of the user by a first photodetector; determining, by a processor communicatively coupled to at least the first photodetector, a distance between the first photodetector and the eye of the user based on reflections of infrared light from the eye of the user detected by the first photodetector; and determining, by the processor, the gaze direction of the user based on at least the distance between the first photodetector and the eye of the user.

The method may further include: illuminating at least a portion of the eye of the user with infrared light by a second illumination source; detecting reflections of infrared light from the eye of the user by a second photodetector, wherein the processor is communicatively coupled to the second photodetector; and determining, by the processor, a distance between the second photodetector and the eye of the user based on reflections of infrared light from the eye of the user detected by the second photodetector, wherein determining, by the processor, the gaze direction of the user based on at least the distance between the first photodetector and the eye of the user includes determining, by the processor, the gaze direction of the user based on both the distance between the first photodetector and the eye of the user and at least the distance between the second photodetector and the eye of the user. Illuminating at least a portion of an eye of the user with infrared light by a first illumination source may include illuminating at least a portion of the eye of the user with infrared light having a first wavelength by the first illumination source, and illuminating at least a portion of the eye of the user with infrared light by a second illumination source may include illuminating at least a portion of the eye of the user with infrared light having the first wavelength by the second illumination source. Alternatively, illuminating at least a portion of an eye of the user with infrared light by a first illumination source may include illuminating at least a portion of the eye of the user with infrared light having a first wavelength by the first illumination source, and illuminating at least a portion of the eye of the user with infrared light by a second illumination source may include illuminating at least a portion of the eye of the user with infrared light having a second wavelength by the second illumination source, the second wavelength different from the first wavelength. The method may further include: illuminating at least a portion of the eye of the user with infrared light by at least one additional illumination source; detecting reflections of infrared light from the eye of the user by at least one additional second photodetector, wherein the processor is communicatively coupled to the at least one additional photodetector; and determining, by the processor, a distance between the at least one additional photodetector and the eye of the user based on reflections of infrared light from the eye of the user detected by the at least one additional photodetector, wherein determining, by the processor, the gaze direction of the user based on both the distance between the first photodetector and the eye of the user and at least the distance between the second photodetector and the eye of the user includes determining, by the processor, the gaze direction of the user based on: the distance between the first photodetector and the eye of the user, the distance between the second photodetector and the eye of the user, and the distance between the at least one additional photodetector and the eye of the user.

The processor may be communicatively coupled to a non-transitory processor-readable storage medium that stores data and/or instructions that, when executed by the processor, cause the processor to: determine the distance between the first photodetector and the eye of the user based on reflections of infrared light from the eye of the user detected by the first photodetector; and determine the gaze direction of the user based on at least the distance between the first photodetector and the eye of the user.

Determining, by a processor communicatively coupled to at least the first photodetector, a distance between the first photodetector and the eye of the user based on reflections of infrared light from the eye of the user detected by the first photodetector may include determining, by the processor, the distance between the first photodetector and the eye of the user based on at least one property selected from a group consisting of: an intensity of reflections of infrared light from the eye of the user detected by the first photodetector, a power of reflections of infrared light from the eye of the user detected by the first photodetector, a luminance of reflections of infrared light from the eye of the user detected by the first photodetector, and/or a time of flight of reflections of infrared light from the eye of the user detected by the first photodetector.

Determining, by the processor, the gaze direction of the user based on at least the distance between the first photodetector and the eye of the user may include determining, by the processor, that the user is gazing in a direction towards the first photodetector when the distance between the first photodetector and the eye of the user is determined to be at or near a minimum value and that the user is gazing in a direction other than towards the first photodetector when the distance between the first photodetector and the eye of the user is determined to be at or near a maximum value.

Illuminating at least a portion of an eye of the user with infrared light by a first illumination source may include modulating the first illumination source.

A proximity-based eye tracker may be summarized as including: a number $X \geq 1$ of illumination sources, each to illuminate at least a portion of an eye of a user with infrared light; a number $Y \geq 1$ of photodetectors, each to detect reflections of infrared light from the eye of the user; a processor communicatively coupled to at least each of the Y photodetectors; and a non-transitory processor-readable storage medium communicatively coupled to the processor, wherein the non-transitory processor-readable storage medium stores data and/or instructions that, when executed by the processor, cause the processor to: determine a respective distance between at least a subset of the Y photodetectors and the eye of the user based on reflections of infrared light from the eye of the user detected by the Y photodetectors; and determine a gaze direction of the user based on at the respective distance between each of the at least a subset of the Y photodetectors and the eye of the user. Depending on the implementation, X may be equal to Y ($X=Y$), X may be greater than Y ($X>Y$), or X may be less than Y ($X<Y$). The number X of illumination sources may include a first illumination source and at least a second illumination source, the first illumination source to illuminate at least a portion of the eye of the user with infrared light having a first wavelength and the second illumination source to illuminate at least a portion of the eye of the user with infrared light having the first wavelength. Alternatively, the number X of illumination sources may include a first illumination source and at least a second illumination source, the first illumination source to illuminate at least a portion of the eye of the user with infrared light having a first wavelength and the second illumination source to illuminate at least a portion of the eye of the user with infrared light having a second wavelength that is different from the first wavelength.

A wearable heads-up display may be summarized as including: a support frame that in use is worn on a head of a user; a processor carried by the support frame; a non-transitory processor-readable storage medium carried by the support frame; and a proximity-based eye tracker carried by the support frame, wherein the proximity-based eye tracker comprises: a first illumination source to illuminate at least a portion of an eye of a user with infrared light; and a first photodetector to detect reflections of infrared light from the eye of the user; and wherein the processor is communicatively coupled to at least the first photodetector and the non-transitory processor-readable storage medium stores data and/or instructions that, when executed by the processor, cause the processor to: determine a distance between the first photodetector and the eye of the user based on reflections of infrared light from the eye of the user; and determine a gaze direction of the user based on at least the distance between the first photodetector and the eye of the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
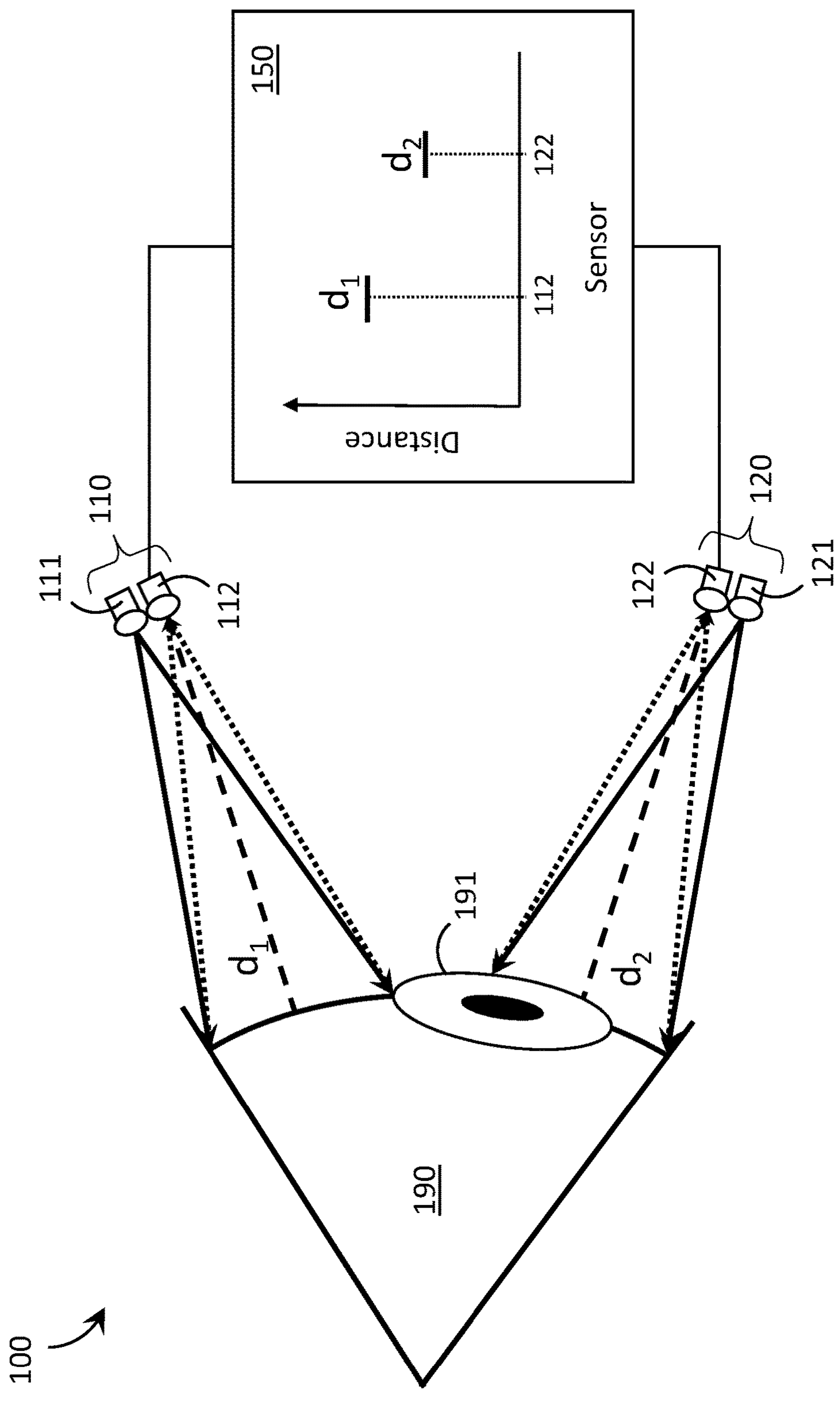
FIG. 1 is an illustrative diagram showing an exemplary implementation of a proximity-based eye tracker in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Eye tracking functionality is highly advantageous as a control/interaction mechanism in a wearable heads-up display ("WHUD"). Some examples of the utility of eye tracking in WHUDs include: influencing where content is displayed in the user's field of view, conserving power by not displaying content that is outside of the user's field of view, influencing what content is displayed to the user, determining where the user is looking, determining whether the user is looking at displayed content on the display or at objects in the external environment through the display, and providing a user interface via which the user may control/interact with displayed content. However, implementing conventional camera-based eye tracking techniques in a WHUD adds significant unwanted bulk to the system. Eye tracking components themselves take up space and, additionally, conventional camera-based eye trackers have high power consumption which adds significant bulk to the battery that powers the WHUD and potentially to related circuitry and heat dispensation structures.

The various embodiments described herein provide systems, devices, and methods for proximity-based eye tracking. More specifically, the present systems, devices, and methods describe eye tracking techniques that detect the proximity of the user's eye relative to at least one sensor (in some cases multiple sensors) and use this proximity information to determine the gaze direction of the user. At least some implementations of this approach take advantage of the fact that the human eye is not perfectly spherical. In particular, the cornea of the eye protrudes significantly outward (known as the "corneal bulge") from the sclera or "white" of the eye. Since the cornea overlies/contains the iris and pupil of the eye, the relative position of the corneal bulge is a good indicator of the gaze direction of the user. In accordance with the present systems, devices, and methods, a proximity sensor positioned near the user's eye may detect changes in a distance between the sensor and the eye as the user's gaze direction changes. In many cases, as the corneal bulge moves towards the proximity sensor the sensor may detect a shorter distance to the eye than when the corneal bulge is directed away from the sensor. In some cases, as the pupil moves towards the proximity sensor the sensor may detect the larger distance through the pupil to the retina at the back of the eye. In either case, this novel proximity-based approach to eye tracking, and variations thereof as described further throughout this specification, is particularly well-suited for use in WHUDs because it requires only relatively small and low-power components that do not contribute significant bulk to the WHUD design.

FIG. 1 is an illustrative diagram showing an exemplary implementation of a proximity-based eye tracker 100 in accordance with the present systems, devices, and methods. FIG. 1 shows the cornea 191 of the eye 190 of a user of eye tracker 100, though for the purposes of this specification and the appended claims eye 190 and cornea 191 are described in association with eye tracker 100 and not as parts or components of eye tracker 100. Eye tracker 100 includes a first proximity sensor 110 and a second proximity sensor 120, each of which is a respective optical proximity sensor comprising a respective illumination source-photodetector pair. Specifically, first proximity sensor 110 comprises first illumination source 111 and first photodetector 112 and second proximity sensor 120 comprises second illumination source 121 and second photodetector 122. First and second illumination sources 111, 121 are each operative to illuminate at least a portion (e.g., at least a respective portion) of eye 190 with infrared light, though in practice other wavelengths of light may be employed. First and second photodetectors 112, 122 are each operative to detect reflections of infrared light from eye 190, though in practice other wavelengths of light may be detected. Generally, first photodetector 112 is operative to detect at least the wavelength(s) of light emitted by first illumination source 111 and second photodetector 122 is operative to detect at least the wavelength(s) of light emitted by second illumination source 121.

Exemplary eye tracker 100 includes two optical proximity sensors 110, 120, though alternative implementations may employ non-optical proximity sensors and/or more or fewer than two proximity sensors as described in more detail later on.

Throughout this specification and the appended claims, reference is often made to "infrared" light. For the purposes of the present systems, devices, and methods, "infrared" light generally refers to light having a wavelength in the range of about 700 nm to about 10 um. In the illustrated example of FIG. 1, optical proximity sensors 110 and 120 both employ wavelengths in the range of 1000±200 nm.

In the exemplary implementation of eye tracker 100, first and second proximity sensors 110, 120 are infrared proximity sensors. Infrared light emitted by first illumination source 111 and second illumination source 121 and impingent on eye 190 is represented by solid-line arrows in FIG. 1. At least a portion of such infrared light is reflected from eye 190 back towards first photodetector 112 and second photodetector 122. Infrared light reflected from eye 190 towards first photodetector 112 and second photodetector 122 is represented by dashed-line arrows in FIG. 1. First illumination source 111 and second illumination source 121 may both emit infrared light of substantially the same wavelength, or first illumination source 111 may emit infrared light having a first wavelength and second illumination source 121 may emit infrared light having a second wavelength that is different from the first wavelength. Photodetectors 112 and 122 may each be tuned and/or designed to detect the first (and second, if applicable) wavelength of infrared light and to substantially filter out (e.g., not detect) other wavelengths of light.

Throughout this specification and the appended claims, references to a "wavelength of light" are used to refer to light of a generally narrow waveband that includes the wavelength. For example, "light having a first wavelength" refers to light of a generally narrow waveband that includes the first wavelength (e.g., as the central and/or peak wavelength in the narrow waveband) and "light having a second wavelength" refers to light of a generally narrow waveband that includes the second wavelength (e.g., as the central and/or peak wavelength in the narrow waveband). A person of skill in the art will appreciate that an illumination source that is specified as emitting "infrared light" and/or "light having a first wavelength" will typically emit a waveband of light that includes (e.g., is centered around) the infrared light and/or first wavelength but may also include certain wavelengths of light above and/or below that wavelength. For the purposes of the present systems, devices, and methods, "infrared light" generally means light having a peak wavelength in the range of about 700 nm to about 10 um and a waveband less than +/−20% around the peak wavelength. Similarly, "light having a first wavelength" generally means light having a peak wavelength equal to the first wavelength and a waveband less than +/−20% around the peak wavelength.

An example of a suitable sensor for use as either or both of first and/or second proximity sensor(s) 110, 120 is the Reflective Object Sensor (e.g., OPB733TR) available from OPTEK Technology Inc. In this example sensor from OPTEK, the illumination source (111, 121) is an infrared light-emitting diode (LED) that provides infrared light having a first wavelength of about 890 nm and the photodetector (112, 122) is an NPN silicon phototransistor molded in a dark epoxy package to minimize visible ambient light sensitivity. However, a person of skill in the art will appreciate that the present systems, devices, and methods are generic to a wide variety of proximity sensor configurations that may employ a wide variety of illumination source types and/or photodetector types. For example, an illumination source may include any or all of: a conventional LED, an infrared LED, a near-infrared LED, an organic LED (OLED), a laser diode, an infrared laser diode, a near-infrared laser diode, and/or a scanning laser projector. In implementations that employ multiple illumination sources and/or photodetectors (as in the illustrative example of eye tracker 100), respective illumination sources may be of the same or different type(s) as one another and likewise respective photodetectors may be of the same or different type(s) as one another. Advantageously, a photodetector (112, 122) may include one or more optical filter(s) positioned proximate the input thereof to transmit infrared light having the wavelength emitted by the corresponding illumination source through to the photodetector and to substantially block light having a wavelength other than the wavelength emitted by the corresponding illumination source from reaching the photodetector. Such a filter configuration can help reduce detection of light that has not originated from the illumination source(s) of the proximity sensor(s) (e.g., sunlight) when detecting such light is undesirable for proximity measurement purposes.

In the exemplary implementation of eye tracker 100, each proximity sensor 110, 120 comprises a respective illumination source-photodetector pair. An advantage of this implementation is that it enables off-the-shelf proximity sensors (such as the OPB733TR from OPTEK) to be used (with or without modification). This configuration is characterized, at least in part, by each illumination source (111, 121) being positioned in relatively close proximity (e.g., within 1 cm) to a respective photodetector (112, 122). However, in alternative implementations each illumination source-photodetector pair may be physically spaced apart from one another (e.g., by a distance greater than 1 cm) or the number of illumination sources and the number of photodetectors may not be equal. Generally, a number X≥1 of illumination sources (111, 121) and a number Y≥1 of photodetectors (112, 122) may be spatially distributed in the vicinity of the eye 190 and, depending on the specific implementation, X may be greater than Y, X may be less than Y, or X may be equal to Y. The relationship between X and Y may influence how the corresponding signals are processed. Furthermore, when multiple illumination sources are used (i.e., when X>1), each illumination source may emit infrared light having substantially the same wavelength (i.e., substantially the same first wavelength), in which case each of the Y≥1 photodetector(s) may be operative to detect infrared light having the first wavelength and to substantially block (i.e., not detect) light other than infrared light having the first wavelength. Alternatively, at least two illumination sources (e.g., each illumination source) may each emit infrared light having a respective and different wavelength (e.g., a first illumination source may emit infrared light having a first wavelength and a second illumination source may emit infrared light having a second wavelength that is different from the first wavelength), in which case a single photodetector may be operative to detect both the first wavelength and the second wavelength (and the eye tracking algorithm may associate each wavelength with its respective illumination source at its respective source position) or a first photodetector may be operative to detect the first wavelength and substantially not detect the second wavelength while a second photodetector may be operative to detect the second wavelength and substantially not detect the first wavelength.

For at least the purpose of processing signals from proximity sensors 110, 120, eye tracker 100 includes or generally communicates with a processor and a non-transitory processor-readable storage medium or memory communicatively coupled to the processor (the processor and the memory are not illustrated in FIG. 1 to reduce clutter, though an illustrative representation of processing signals from proximity sensors 110 and 120 by the processor and memory is represented in block 150). The processor is communicatively coupled to at least first photodetector 112 and second photodetector 122. The memory stores processor-executable data and/or instructions that, when executed by the processor, cause the processor to at least process signals from the first photodetector 112 in order to determine a gaze direction of the user based on the distance between eye 190 and proximity sensor 110. For example, the data and/or instructions stored in the memory may cause the processor to: i) determine a distance between first photodetector 112 and eye 190 based on reflections from eye 190 of infrared light (e.g., infrared light having a first wavelength emitted by first illumination source 111) detected by first photodetector 112, and ii) determine a gaze direction of the user based on at least the distance determined between first photodetector 112 and eye 190. Some implementations may incorporate data from a second photodetector 122 before determining the gaze direction of the user. In such implementations, the data and/or instructions stored in the memory may cause the processor to: i) determine a distance between first photodetector 112 and eye 190 based on reflections from eye 190 of infrared light (e.g., infrared light emitted by first illumination source 111) detected by first photodetector 112, ii) determine a distance between second photodetector 122 and eye 190 based on reflections from eye 190 of infrared light (e.g., infrared light emitted by second illumination source 121) detected by second photodetector 122, and iii) determine the gaze direction of the user based on both the distance between first photodetector 112 and eye 190 and the distance between second photodetector 122 and eye 190.

The distance between the eye 190 and any given proximity sensor may be measured in a variety of different ways. In the case of the optical proximity sensors 110, 120 of eye tracker 100, the distance between eye 190 and any given photodetector (112, 122) may be determined by the processor communicatively coupled to that photodetector based on, for example, the intensity, power, or luminance of reflections of infrared light (e.g., the infrared light emitted by the corresponding illumination source(s)) detected by the photodetector or, for another example, based on time of flight of infrared light detected by the photodetector. The distance between the eye 190 and a photodetector (112, 122) may be determined by the processor as a distance from a particular point on the eye 190 to the photodetector (112, 122) or the average or minimum distance from a collection of points on the eye 190 to the photodetector (112, 122). Because the surface of the eye 190 is curved, the minimum distance from the eye 190 to a photodetector (112, 122) may generally be represented by a straight line/vector that is normal to the surface of eye 190. For the gaze direction of eye 190 depicted in FIG. 1, the minimum distance between eye 190 and first photodetector 112 of first proximity sensor 110 is represented by the dashed line marked $d_1$ and the minimum distance between eye 190 and second photodetector 122 of second proximity sensor 120 is represented by the dashed line marked $d_2$. Both line $d_1$ and $d_2$ are normal (i.e., perpendicular) to the surface of eye 190. Even though first proximity sensor 110 and second proximity sensor 120 are each positioned at about the same radial distance from the center of the eye 190, second proximity sensor 120 measures a shorter distance $d_2$ than first proximity sensor 110 ($d_1$) because cornea 191 is directed towards second proximity sensor 120 and not towards first proximity sensor 110. In other words, the user is gazing in the general direction of second proximity sensor 120 and away from the general direction of first proximity sensor 110.

The magnitudes of distances $d_1$ and $d_2$ may be determined by the processor of eye tracker 100 in response to the processor executing data and/or instructions stored in the memory of eye tracker 100. The processor and the memory themselves are not illustrated in FIG. 1 to reduce clutter but graph 150 provides an illustrative representation of the determination of distances $d_1$ and $d_2$ by the processor in response to executing data and/or instructions stored in the memory. First illumination source 111 illuminates at least a first portion of eye 190 with infrared light (e.g., infrared light having a first wavelength). Infrared light that is reflected from the first portion of the eye 190 is detected by first photodetector 112. In the illustrated example, the first portion of eye 190 from which reflected infrared light is detected by first photodetector 112 does not include any portion of the cornea 191. Accordingly, the processor of eye tracker 100 determines, in response to executing data and/or instructions stored in the memory of eye tracker 100, that the distance between first photodetector 112 and eye 190 is a first distance having a first magnitude $d_1$ and identifies first distance $d_1$ as being too large to include the cornea 191. Based on this, the processor of eye tracker 100 may determine, in response to executing data and/or instructions stored in the memory of eye tracker 100, that the user is not gazing in the general direction of first photodetector 112.

Meanwhile, second illumination source 121 illuminates at least a second portion of eye 190 with infrared light (e.g., infrared light having the first wavelength or infrared light having a second wavelength that is different from the first wavelength). Infrared light that is reflected from the second portion of the eye 190 is detected by second photodetector 122. In the illustrated example, the second portion of eye 190 from which reflected infrared light is detected by second photodetector 122 does include at least a portion of the cornea 191. Accordingly, the processor of eye tracker 100 determines, in response to executing data and/or instructions stored in the memory of eye tracker 100, that the distance between second photodetector 122 and eye 190 is a second distance having a second magnitude $d_2$ and identifies second distance $d_2$ as being sufficiently small that the user is gazing in the general direction of second photodetector 122.

The relative magnitudes of $d_1$ and $d_2$ are illustrated in graph 150. The magnitude $d_1$ of the first distance is greater in magnitude than the magnitude $d_2$ of the second distance because $d_1$ corresponds to a distance (e.g., an average or minimum distance) to a first portion of eye 190 that does not include the cornea 191 and $d_2$ corresponds to a distance (e.g., an average or minimum distance) to a second portion of eye 190 that does include at least a portion of cornea 191. Because cornea 191 is characterized by a corneal bulge that protrudes outward from the surface of eye 190, the distance from eye 190 to a fixed photodetector position in front of eye 190 is greater when measured from a point (or averaged or minimized over a collection of points) that does not include cornea 191 (e.g., $d_1$) and less when measured from a point (or averaged or minimized over a collection of points) that does include cornea 191 (e.g., $d_2$). In accordance with the present systems, devices, and methods, the data and/or instructions that, when executed by the processor, cause the processor to determine a gaze direction of the user based on at least the distance between a first photodetector (112) and the eye (190) of the user may cause the processor to determine that the user is gazing in a direction towards the first photodetector (112) when the distance between the first photodetector (112) and the eye (190) of the user is determined to be at or near a minimum value and that the user is gazing in a direction other than towards the first photodetector (112) when the distance between the first photodetector (112) and the eye (190) of the user is determined to be at or near a maximum value. In some implementations, the data and/or instructions may, when executed by the processor, cause the processor to determine one of a range of gaze directions for the eye of the user based on how the detected distance to the eye of the user compares to the maximum distance (i.e., gazing generally away from the corresponding photodetector) and the minimum distance (i.e., gazing directly towards the corresponding photodetector). For example, the data and/or instructions, when executed by the processor, may cause the processor to determine that the user is gazing in: a first direction when the detected distance is 10% of the maximum distance, a second direction when the detected distance is 15% of the maximum distance, . . . , an additional direction when the detected distance is 50% of the maximum distance, and so on. The precision and/or resolution of eye tracker 100 (e.g., the number of unique gaze directions detectable by eye tracker 100) may depend on a number of factors, including without limitation: the number of illumination sources used, the number of photodetectors used, the precision and/or resolution of the photodetector(s) used, the effectiveness of ambient light filtering, the position of the photodetector(s) relative to the eye, and so on.

For the purposes of proximity-based eye tracking, the absolute distance to the eye may or may not be useful but, generally, any change in the distance to the eye may be particularly useful. For example, a measured decrease in the distance to the eye relative to a baseline value (e.g., relative to a maximum value corresponding to the cornea being directed away from the corresponding proximity sensor) may indicate that the cornea 191 of eye 190 has moved towards the position of the proximity sensor and therefore the user's gaze direction has moved towards the position of the proximity sensor, while a measured increase in the distance to the eye relative to a baseline value (e.g., relative to a minimum value corresponding to the cornea being directed towards the corresponding proximity sensor) may indicate that the cornea 191 of eye 190 has moved away from the position of the proximity sensor and therefore the user's gaze direction has moved away from the position of the proximity sensor.

When optical proximity sensing is used in a proximity-based eye tracker as described herein (e.g., as illustrated in eye tracker 100 of FIG. 1), generally at least one illumination source and at least one photodetector may be included, with both the illumination source and the photodetector matched to operate with infrared light having the same wavelength. When a single wavelength of light is used, a single illumination source and multiple photodetectors may be used or multiple illumination sources and multiple photodetectors may be used, depending on the particular implementation. In alternative approaches, multiple different wavelengths of light may be used. In such approaches, each illumination source-photodetector pair may be matched to operate using a different respective wavelength of light. Or, multiple illumination sources and a single photodetector may be employed, where each of the illumination sources is operative to illuminate the eye with a respective wavelength of light and the photodetector is operative to i) detect all of the wavelengths of light, and ii) identify the wavelength of light upon reflection. In this case, the single photodetector may provide signals to a processor that enable the processor to determine a respective distance corresponding to each wavelength of light used, which the processor may then associate with the respective position of each illumination source to determine (based on measured distances that determine the position of the corneal bulge) towards which illumination source(s) the corneal bulge is facing and therefore towards which illumination source(s) the user is gazing.

The surface of the eye is curved and the distance thereto (e.g., an average or minimum distance thereto) may be represented, as in FIG. 1, by a normal/perpendicular line/vector that connects between the photodetector and the eye. For this reason, it can be advantageous to position a photodetector, relative to an illumination source, at a position that is oriented to receive light originating from the illumination source that is reflected perpendicularly from (i.e., normal to) a surface of the eye. In an illumination source-photodetector pair, such may be accomplished by positioning the illumination source and the photodetector in close proximity with one another (i.e., within less than 1 cm of each other).

Generally, for the purpose of measuring distance and/or proximity, it may be advantageous for a photodetector (112, 122) of a proximity-based eye tracker to include an optical configuration (e.g., one or more lens(es), prism(s), or similar) to focus input light on the photodetector and/or to provide the photodetector with a relatively narrow field of view. The processor of the proximity-based eye tracker determines distance between the photodetector and the eye based on light reflected from the eye and detected by the photodetector. As previously described, the minimum distance between the fixed position of a photodetector and the surface of the eye is given by a straight line that connects from the photodetector to the particular point on the eye that causes the straight line to be perpendicular to (e.g., normal to) the surface of the eye. Accordingly, the photodetector may include one or more optic(s) (e.g., one or more lens(es), reflector(s), mirror(s), prism(s), grating(s), collimator(s), shutter(s), aperture(s), dichroic(s), filter(s), refractor(s), and/or diffractor(s)) at its input that enables the photodetector to see/detect light reflected from an area that includes the particular point on the surface of the eye from which reflected light is perpendicular/normal to the surface of the eye and advantageously occludes or otherwise does not enable the photodetector to see/detect light reflected from outside of that area. For eye tracking purposes, the area of relevance/focus for a photodetector in a proximity sensor may be less than or equal to the visible area of the eye, or less than or equal to a sub-region of the visible area of the eye, such as a circle having a diameter less than or equal to the diameter of the cornea, a circle having a diameter less than or equal to the diameter of the pupil, or a circle having a diameter less than or equal to 1 cm. Light that enters the photodetector from angles that are outside of this area (whether reflected from the eye or not) may generally be following a path that is far from normal to the eye and therefore not accurately representative of the minimum distance between the eye and the photodetector.

In implementations for which it is advantageous for a photodetector to operate with a limited/narrow field of view, it may likewise be advantageous for an illumination source to include one or more optic(s) at its output to shape the light emitted by the illumination source so that the illumination source generally illuminates the area/sub-region of the eye that is within the field of view of the photodetector but does not unnecessarily illuminate the area(s)/sub-region(s) of the eye that is/are outside of the field of view of the photodetector. In implementations that employ a laser diode as a light source such shaping may involve collimating, applying a divergence to, and/or setting the spot size of laser light output by the laser diode. In implementations that employ a LED such shaping may involve shaping the emitted light to a cone that illuminates the area/sub-region of the eye that is within the field of view of the photodetector. For the purposes of the present systems, devices, and methods, the "at least a portion of the eye of the user" that is illuminated by an illumination source generally includes the area/sub-region of the eye that is within the field of view of at least one photodetector. The field of view of the photodetector may be determined, at least in part, by optics at the input to the photodetector (as well as the position and orientation of the photodetector, among other things) and the portion of the eye of the user that is illuminated by the illumination source may be determined, at least in part, by optics at the output of the illumination source (as well as the position and orientation of the illumination source, among other things).

When the intensity (or similarly, power or luminance) of reflected infrared light is used by the processor of a proximity-based eye tracker as the basis for determining distance to the eye as described herein, the proximity sensor/processor may be calibrated to associate certain ranges of reflected infrared intensity with certain distances. For example, from a given position, a proximity sensor (110) of eye tracker 100 may detect a first intensity of reflected infrared light from eye 190 when the user is not looking toward the proximity sensor (110). This first intensity corresponds to a first distance ($d_1$) between the proximity sensor (110) and eye 190 when the portion/region of eye 190 illuminated and detected by the proximity sensor (110) does not include corneal bulge 191. Since this first distance ($d_1$) does not include corneal bulge 191, this first distance ($d_1$) is a relatively large distance (e.g., a maximum distance) and the corresponding first intensity is relatively low. When the user does look toward a proximity sensor (120), the proximity sensor (120) may detect a second intensity of reflected infrared light from eye 190. This second intensity corresponds to a second distance ($d_2$) between the proximity sensor (120) and eye 190 when the portion/region of eye 190 illuminated and detected by the proximity sensor (120) does include corneal bulge 191. Since this second distance ($d_2$) does include corneal bulge 191, this second distance ($d_2$) is a relatively small distance (e.g., a minimum distance) compared to the first distance ($d_1$) and the corresponding second intensity is relatively high.

The light emitted by one or more illumination source(s) may be "always on" during operation of the eye tracker or it may be modulated (e.g., intensity-modulated, time-modulated, and/or frequency/wavelength modulated). When the light from an illumination source is modulated, the proximity sensor/processor may be calibrated to use time of flight of infrared light to measure distance to the eye. A time of flight approach may, generally, measure the time between emitting a pulse of infrared light from the illumination source (111) of a proximity sensor (110) and detecting infrared light corresponding to that same emitted pulse reflected from the eye of the user. Using the known speed of the emitted/reflected light, the measured time is converted into a measured distance which depends on the presence/absence of the corneal bulge in the same way as the intensity-based distance measure described above.

In accordance with the present systems, devices, and methods, a proximity sensor may detect the difference between a) the distance from its position to an eye when the eye is not looking towards the proximity sensor, and b) the distance from its position to the eye when the eye is looking towards the proximity sensor. This change in distance may be due, at least in part, to the existence of the corneal bulge which necessarily brings the outer surface of the eye marginally closer to objects (e.g., a proximity sensor) in whichever direction the eye is looking/gazing. In some implementations, a further degree of precision in the user's gaze direction may be determined based on aspherical factors of the eye and/or corneal bulge. For example, the distance from a proximity sensor to the surface of the eye may: i) be at a maximum when the eye is looking completely away from the proximity sensor such that the proximity sensor does not detect any aspect of the corneal bulge, ii) begin to decrease as the eye begins to look towards the proximity sensor such that the proximity begins to detect an edge of the corneal bulge, iii) continue to decrease by more and more as the eye moves to look closer and closer towards the proximity sensor such that the proximity sensor detects more and more of the corneal bulge and more and more towards the center of the corneal bulge, iv) be at a minimum when the eye is looking directly towards the proximity sensor such that the proximity sensor maximally detects the corneal bulge and detects the very center of the corneal bulge, and v) increase as the eye moves to look away from the proximity sensor such that the proximity sensor detects relatively less of the corneal bulge. Thus, a single proximity sensor (e.g., 110 or 120) may be used to provide a certain degree of accuracy/precision in determining the gaze direction of an eye.

In accordance with the present systems, devices, and methods, a proximity-based eye tracker may employ multiple proximity sensors in order to improve the accuracy/precision of gaze direction determination. Any number of proximity sensors may be used depending on the specific implementation. Each proximity sensor may detect (together with the processor and memory to which the proximity sensors are communicatively coupled) whether or not the user is generally gazing in its direction (based on the presence or absence of the corneal bulge in the distance measured). When, for example, two (or more) proximity sensors simultaneously detect that the user is generally gazing in their direction (based on the reduced distance corresponding to the presence of the corneal bulge), the eye tracker may determine that the user is gazing in a direction generally in between the two (or more) proximity sensors. A simple algorithm for determining the gaze direction of the user based on proximity sensor data may, for example, determine when the user is gazing in one of X discrete directions where each of the X directions corresponds to a minimum distance output by a respective one of X proximity sensors. For example, a system with X=4 proximity sensors may determine when the user is gazing in one of at least X=4 general directions, each of the X=4 general directions corresponding to the eye generally gazing towards a respective one of the X=4 proximity sensors. A more elaborate algorithm for determining the gaze direction of the user may combine data from adjacent pairs of proximity sensors. For example, a system comprising the X proximity sensors may further determine when the user is gazing in a direction generally "in between" an adjacent pair of proximity sensors based on detection of the corneal bulge by those two proximity sensors. Such a system may be operable to determine when the user is gazing in any one of X directions towards a respective one of X proximity sensors and when the user is gazing in any one of Y directions in between a respective pair of adjacent proximity sensors. Thus, using this more elaborate algorithm the system comprising X=4 proximity sensors from the previous example may be further able to determine when the user is gazing in any one of an additional Y=4 directions, bringing the total number of directions discernible by such a system up to eight (8) discrete directions.

The above descriptions of exemplary algorithms (and numbers of discernible directions cited) are used for illustrative purposes only and not intended to limit the present systems, devices, and methods in any way. Additional algorithms, including but not limited to variants on the above exemplary algorithms, may also be employed. Some algorithms may enable considerably more discrete directions than the number of proximity sensors to be determined. Some algorithms may enable a substantially continuous range of gaze directions to be determined. Some algorithms may use all proximity sensors simultaneously and some algorithms may use only a subset of proximity sensors at any given time. Some algorithms may modulate the light output by one or more illumination source(s) and use one or more photodetector(s) (including but not limited to a photodetector packaged with the modulated illumination source within the same optical proximity sensor) to detect reflections of the modulated light. These and other techniques may be employed to expand the range and diversity of samples collected and processed by the proximity-based eye trackers described herein.

In the various implementations described herein, optical proximity sensors are used only as an illustrative example of a type of proximity sensor that may be used in a proximity-based eye tracker. The present systems, devices, and methods may employ other types of non-optical proximity sensors, such as acoustic proximity sensors and/or ultrasonic proximity sensors. Furthermore, infrared light is used herein as an example of light that may be used by an optical proximity sensor. Infrared light may be advantageous because it is relatively low energy (compared to shorter wavelengths of light) and invisible to the human eye, but in principle virtually any wavelength of light may be used in a proximity-based eye tracker as described herein.

The proximity-based eye trackers described herein are particularly well-suited for use in head-mounted displays, such as in virtual reality headsets and/or in WHUDs. This is at least because the proximity-based eye trackers described herein are relatively smaller and lower-power than many alternative approaches. In particular, the proximity sensors described herein may easily be incorporated into the existing support structure of a head-mounted display and the processing power needed to determine gaze direction from proximity sensor data can be significantly less than that required by alternative camera/video-based eye tracking systems.

Figure 2:
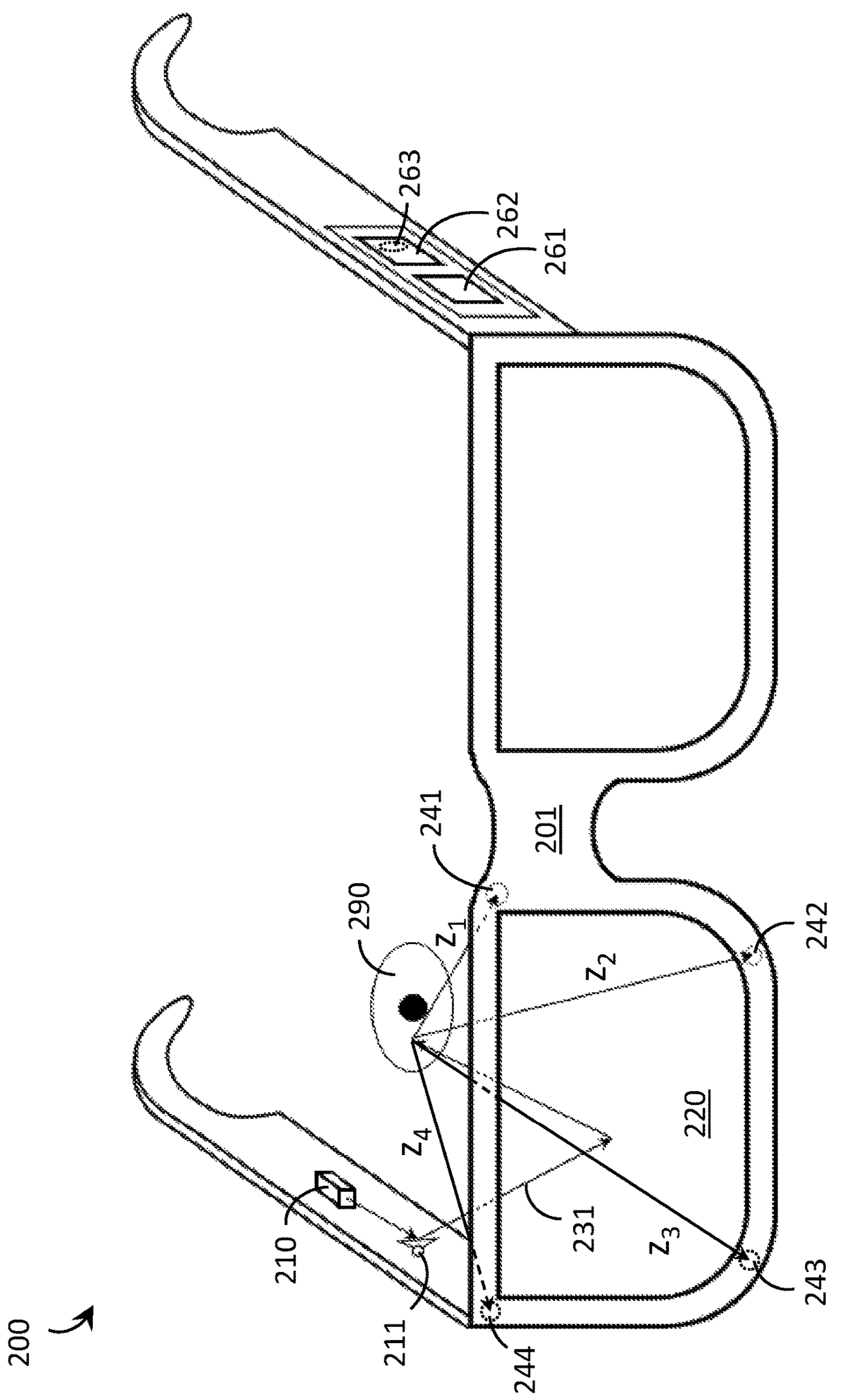
FIG. 2 is a perspective view of a wearable heads-up display comprising a proximity-based eye tracker mounted on a wearable support frame in accordance with the present systems, devices, and methods.

FIG. 2 is a perspective view of a WHUD 200 comprising a proximity-based eye tracker (not called out as a unit because it comprises several distributed components) mounted on a wearable support frame 201 in accordance with the present systems, devices, and methods. Support frame 201 carries (e.g., has mounted therein or thereon) the elements of a proximity-based eye tracker similar to eye tracker 100 from FIG. 1, including at least a first illumination source 210 that emits infrared light 231 and four (as an illustrative example, actual number may vary in different implementations) infrared photodetectors 241, 242, 243, and 244 distributed around the periphery of eye 290 when support frame 201 is worn on the head of a user. In the illustrated example, first illumination source 210 is a scanning laser projector that has been adapted to emit infrared light. An example of such a projector is described in U.S. Provisional Patent Application Ser. No. 62/167,767 (now US Non-Provisional Patent Publication Nos. 2016-0349514, 2016-0349515, and 2016-0349516). Projector 210 outputs infrared light 231 which is redirected by a scanning mirror 211 and a holographic combiner 220 to illuminate eye 290. At any given time, infrared light 231 from projector 210 may illuminate only a relatively small spot (e.g., about the spot size of the laser output from projector 210) on eye 290 but together with scanning mirror 211 projector 210 may be used to sweep the infrared beam 231 over all or a portion of the total area of eye 290. At least some of the infrared light 231 may then be reflected from eye 290 and detected by any or all of photodetectors 241, 242, 243, and/or 244. The outputs of photodetectors 241, 242, 243, and 244 are communicatively coupled to a processor 261. Processor 261 is communicatively coupled to a non-transitory processor-readable storage medium or memory 262 that stores processor-executable data and/or instructions 263 which, when executed by processor 261, cause processor 261 to: i) determine a respective distance between any/all of photodetectors 241, 242, 243, and/or 244 (distances $z_1$, $z_2$, $z_3$, and $z_4$, respectively) and eye 290 based on reflections of infrared light 231 from eye 290; and ii) determine a gaze direction of the user based on at least the respective distance(s) ($z_1$, $z_2$, $z_3$, and/or $z_4$) between any/all of photodetectors 241, 242, 243, and/or 244 and/or eye 290.

The purposes of the illustrative example depicted in FIG. 2 are two-fold: i) to show the elements of a proximity-based eye tracker mounted in or on a support frame (201), such as the support frame of a pair of virtual/augmented reality glasses or WHUD (200), and ii) to show the use of a scanning laser projector (210) as the illumination source in a proximity-based eye tracker. However, a person of skill in the art will appreciate that the proximity-based eye trackers described herein may include one or more LED illumination source(s) mounted in/on a support frame and/or a support frame configuration that does not resemble a pair of eyeglasses.

Figure 3:
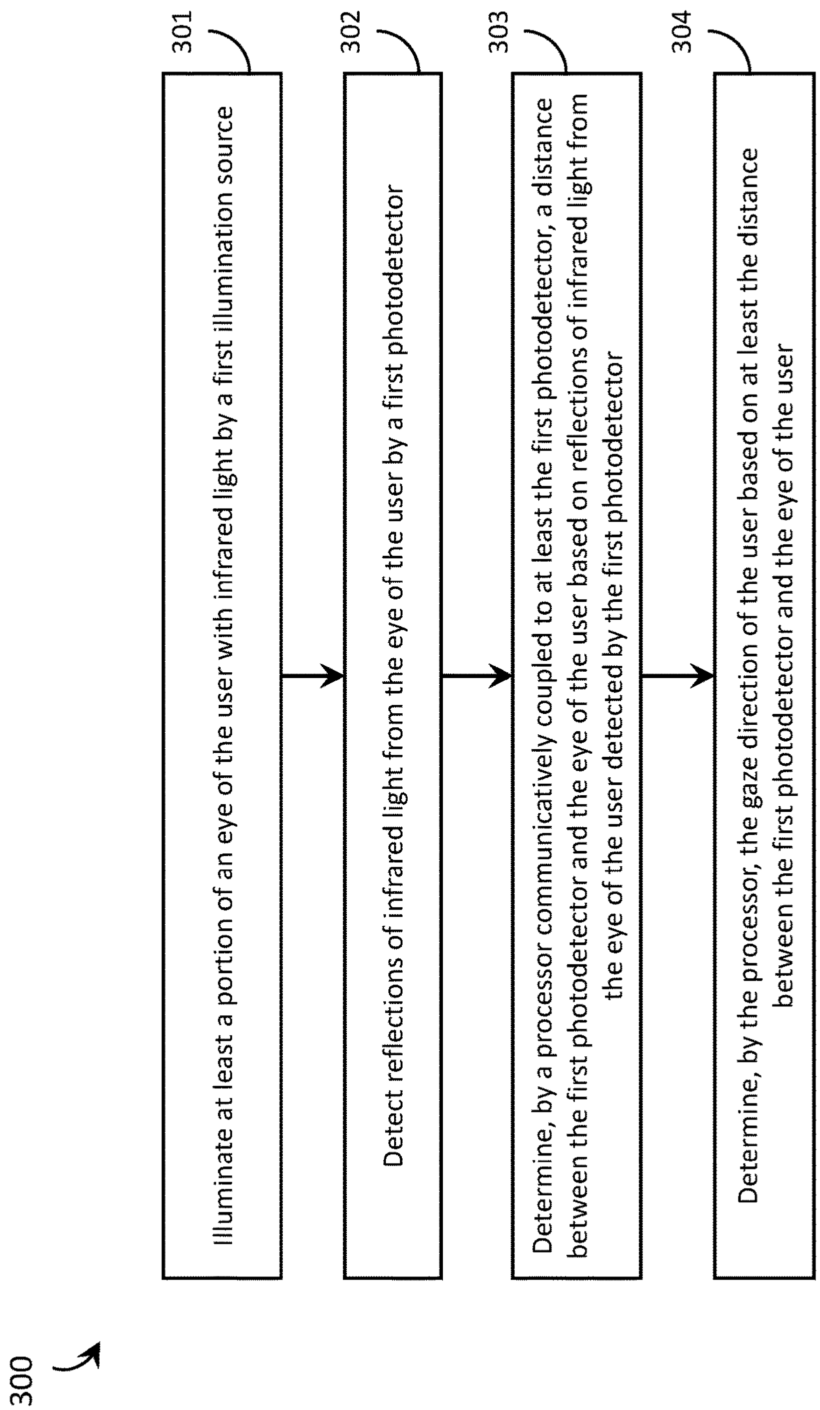
FIG. 3 is a flow-diagram showing a method of determining a gaze direction of a user based on proximity-sensing in accordance with the present systems, devices, and methods.

FIG. 3 is a flow-diagram showing a method 300 of determining a gaze direction of a user based on proximity-sensing in accordance with the present systems, devices, and methods. Method 300 includes four acts 301, 302, 303, and 304, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 300, the term "user" refers to a person that is wearing or otherwise using a proximity-based eye tracker such as eye tracker 100 from FIG. 1.

At 301, a first illumination source of the proximity-based eye tracker illuminates at least a portion of an eye of the user with infrared light. The illumination source may include at least one infrared LED and/or at least one infrared laser diode and it may be on continuously during operation or it may be modulated.

At 302, a first photodetector detects a reflection of infrared light from the eye of the user. The photodetector may include a filter or other shielding mechanism to limit the photodetector's sensitivity to wavelengths of light that do not match the wavelength of the infrared light output by the first illumination source at 301.

At 303, a processor that is communicatively coupled to at least the first photodetector determines a distance between the first photodetector and the eye of the user based at least in part on reflections of infrared light detected by the first photodetector at 302. As previously described, this distance determination may be based on, for example, intensity, power, or luminance of the reflections of infrared light detected at 302 and/or time of flight of the reflections of infrared light detected at 302.

At 304, the processor determines the gaze direction of the user based on at least the distance between the first photodetector and the eye of the user determined by the processor at 303. The processor may be communicatively coupled to a non-transitory processor-readable storage medium or memory storing data and/or instructions that, when executed by the processor, cause the processor to complete acts 303 and 304 of method 300. As previously described, the processor may coarsely determine that the user simply "is or is not" generally gazing in the direction of the first photodetector, or the processor may more finely determine a more precise gaze direction of the user.

Generally, the data and/or instructions that, when executed by the processor, cause the processor to determine (per 304) the gaze direction of the user based on at least the distance between the first photodetector and the eye of the user determined by the processor at 303 may cause the processor to effect a mapping between photodetector signals (representative of distance measurements) and gaze directions. Such a mapping may employ and or all of: a look-up table, a transformation (e.g., a linear transformation, a non-linear transformation, a geometric transformation, or a neural-network-based transformation), or another mapping algorithm.

In order to enable finer and more precise determinations of the gaze direction of the user, method 300 may be extended to include: illuminating at least a portion of the eye of the user with infrared light by a second illumination source; detecting reflections of infrared light from the eye of the user by a second photodetector, and determining, by the processor, a distance between the second photodetector and the eye of the user based on reflections of infrared light from the eye of the user detected by the second photodetector. In this case, determining, by the processor, the gaze direction of the user based on at least the distance between the first photodetector and the eye of the user may include determining, by the processor, the gaze direction of the user based on both the distance between the first photodetector and the eye of the user and at least the distance between the second photodetector and the eye of the user. Still finer and more precise determinations of the gaze direction of the user may include: illuminating at least a portion of the eye of the user with infrared light by at least one additional illumination source; detecting reflections of infrared light from the eye of the user by at least one additional second photodetector, and determining, by the processor, a distance between the at least one additional photodetector and the eye of the user based on reflections of infrared light from the eye of the user detected by the at least one additional photodetector. In this case, determining, by the processor, the gaze direction of the user based on both the distance between the first photodetector and the eye of the user and at least the distance between the second photodetector and the eye of the user may include determining, by the processor, the gaze direction of the user based on: the distance between the first photodetector and the eye of the user, the distance between the second photodetector and the eye of the user, and the distance between the at least one additional photodetector and the eye of the user.

The proximity-based eye tracker systems, devices, and methods described herein may be used as part of a control interface (e.g., a human-computer interface) as described in, for example, U.S. Provisional Patent Application Ser. No. 62/236,060; and U.S. Non-Provisional patent application Ser. No. 15/282,535.

Where infrared light is used to illuminate all or a portion of the eye for eye tracking purposes, the full area of the eye may be completely illuminated or portions of the eye may be illuminated in any of various patterns. For example, passive patterns such as a grid or set of parallel lines may be employed, or active patterns may be employed. Examples of active illumination patterns include: "binary style search" in which the area of the eye is divided into binary regions, the eye tracker determines which of the two regions contains a feature (e.g., the pupil or cornea), that region is subsequently divided into binary regions, and the process is continued with smaller and smaller regions until the position of the feature is identified with the desired resolution; "recent area focus" in which once a trusted eye position is found subsequent scans are limited to a subset of the full area that includes the position of the known eye position, with the subset being based on the likelihood of where the eye could possibly move within the time since the trusted eye position was identified; and/or "rotary scan" in which the area of the eye is divided into wedges or pie pieces that are scanned in succession.

The use of infrared light is advantageous because such light is readily distinguishable from visible light. However, infrared light is also prevalent in the environment so a narrow waveband photodetector that is optimized to be responsive to infrared light will nevertheless detect environmental noise. In order to help mitigate this effect, infrared light that is used for eye tracking purposes may be encoded in any of a variety of different ways to enable such light to be distinguished from environmental light of a similar wavelength. For example, narrow waveband infrared light that is used for eye tracking purposes may be deliberately polarized and a corresponding polarization filter may be applied to a narrow waveband infrared photodetector so that the photodetector is only responsive to light that is in the narrow waveband and of the correct polarization. As another example, narrow waveband light that is used for eye tracking purposes may be modulated with a deliberate modulation pattern (e.g., intensity, time, intensity and time) and light providing this pattern can be extracted from the intensity map provided by the photodetector during the signal processing and analysis of the photodetector output.

The various embodiments described herein generally reference and illustrate a single eye of a user (i.e., monocular applications), but a person of skill in the art will readily appreciate that the present systems, devices, and methods may be duplicated in order to provide proximity-based eye tracking for both eyes of the user (i.e., binocular applications).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/281,041, U.S. Provisional Patent Application Ser. No. 62/236,060; U.S. Non-Provisional patent application Ser. No. 15/282,535; U.S. Provisional Patent Application Ser. No. 62/167,767; US Non-Provisional Patent Publication Nos. 2016-0349514, 2016-0349515, and 2016-0349516 (now US Non-Provisional Patent Publication Nos. 2016-0349514, 2016-0349515, and 2016-0349516), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A proximity-based eye tracker comprising:

a first illumination source to illuminate at least a portion of an eye of a user with infrared light;

a first photodetector to detect reflections of infrared light from the eye of the user;

a processor communicatively coupled to at least the first photodetector; and a non-transitory processor-readable storage medium communicatively coupled to the processor, wherein the non-transitory processor-readable storage medium stores data and/or instructions that, when executed by the processor, cause the processor to:

determine a distance between the first photodetector and the eye of the user based on reflections of infrared light from the eye of the user; and determine a gaze direction of the user based on at least the distance between the first photodetector and the eye of the user, wherein the data and/or instructions that, when executed by the processor, cause the processor to determine the gaze direction of the user based on at least the distance between the first photodetector and the eye of the user cause the processor to determine that the user is gazing in a direction towards the first photodetector when the distance between the first photodetector and the eye of the user is determined to be at or near a minimum value and that the user is gazing in a direction other than towards the first photodetector when the distance between the first photodetector and the eye of the user is determined to be at or near a maximum value.

2. The proximity-based eye tracker of claim 1, further comprising:

a second illumination source to illuminate at least a portion of the eye of the user with infrared light; and a second photodetector to detect reflections of infrared light from the eye of the user, wherein:

the processor is communicatively coupled to the second photodetector; and the non-transitory processor-readable storage medium stores data and/or instructions that, when executed by the processor, cause the processor to:

determine a distance between the second photodetector and the eye of the user based on reflections of infrared light from the eye of the user, and wherein the data and/or instructions that, when executed by the processor, cause the processor to determine a gaze direction of the user based on at least the distance between the first photodetector and the eye of the user cause the processor to determine the gaze direction of the user based on both the distance between the first photodetector and the eye of the user and the distance between the second photodetector and the eye of the user.

3. The proximity-based eye tracker of claim 2, further comprising:

at least one additional illumination source to illuminate at least a portion of the eye of the user with infrared light; and at least one additional photodetector to detect reflections of infrared light from the eye of the user, wherein:

the processor is communicatively coupled to the at least one additional photodetector; and the non-transitory processor-readable storage medium stores data and/or instructions that, when executed by the processor, cause the processor to:

determine a distance between the at least one additional photodetector and the eye of the user based on reflections of infrared light from the eye of the user, and wherein the data and/or instructions that, when executed by the processor, cause the processor to determine the gaze direction of the user based on both the distance between the first photodetector and the eye of the user and the distance between the second photodetector and the eye of the user cause the processor to determine the gaze direction of the user based on: the distance between the first photodetector and the eye of the user, the distance between the second photodetector and the eye of the user, and the distance between the at least one additional photodetector and the eye of the user.

4. The proximity-based eye tracker of claim 1, further comprising:

a support frame that in use is worn on a head of the user, wherein the first illumination source and the first photodetector are both mounted on the support frame, the first illumination source positioned to illuminate at least a portion of the eye of the user with infrared light when the support frame is worn on the head of the user and the first photodetector positioned to detect reflections of infrared light from the eye of the user when the support frame is worn on the head of the user.

5. The proximity-based eye tracker of claim 4 wherein the first illumination source and the first photodetector are positioned within 1 cm of each other on the support frame.

6. The proximity-based eye tracker of claim 1 wherein the data and/or instructions that, when executed by the processor, cause the processor to determine a distance between the first photodetector and the eye of the user based on reflections of infrared light from the eye of the user cause the processor to determine a distance between the first photodetector and the eye of the user based on at least one property selected from a group consisting of: intensity of reflections of infrared light from the eye of the user, power of reflections of infrared light from the eye of the user, luminance of reflections of infrared light from the eye of the user, and time of flight of reflections of infrared light from the eye of the user.

7. The proximity-based eye tracker of claim 1, further comprising:

a second photodetector to detect reflections of infrared light from the eye of the user, wherein:

the processor is communicatively coupled to the second photodetector; and the non-transitory processor-readable storage medium further stores data and/or instructions that, when executed by the processor, cause the processor to:

determine a distance between the second photodetector and the eye of the user based on reflections of infrared light from the eye of the user; and determine the gaze direction of the user based on both the distance between the first photodetector and the eye of the user and the distance between the second photodetector and the eye of the user.

8. The proximity-based eye tracker of claim 1, further comprising:

a first optic positioned proximate an output of the first illumination source in an optical path of infrared light emitted by the first illumination source, the first optic to shape infrared light emitted by first illumination source to a cone that illuminates the at least a portion of the eye of the user; and a second optic positioned proximate an input of the first photodetector in an optical path of infrared light reflected from the eye of the user, the second optic to focus infrared light reflected by the at least a portion of the eye of the user on the first photodetector.

9. The proximity-based eye tracker of claim 1, further comprising:

a first optical filter positioned proximate the input of the first photodetector to transmit infrared light having a first wavelength through to the photodetector and block light having a wavelength other than the first wavelength from reaching the photodetector.

10. A proximity-based eye tracker comprising:

a support frame that in use is worn on a head of the user;

a number $X \geq 1$ of illumination sources mounted on the support frame, each to illuminate at least a portion of an eye of a user with infrared light when the support frame is worn on the head of the user;

a number $Y \geq 1$ of photodetectors mounted on the support frame, each to detect reflections of infrared light from the eye of the user when the support frame is mounted on the head of the user;

a processor communicatively coupled to at least each of the Y photodetectors; and a non-transitory processor-readable storage medium communicatively coupled to the processor, wherein the non-transitory processor-readable storage medium stores data and/or instructions that, when executed by the processor, cause the processor to:

determine a respective distance between at least a subset of the Y photodetectors and the eye of the user based on reflections of infrared light from the eye of the user detected by the Y photodetectors; and determine a gaze direction of the user based on at the respective distance between each of the at least a subset of the Y photodetectors and the eye of the user.

11. The proximity-based eye tracker of claim 10 wherein X=Y.

12. The proximity-based eye tracker of claim 10 wherein X>Y.

13. The proximity-based eye tracker of claim 10 wherein X<Y.

* * * * *